May 23, 1933.  R. C. ASHENDEN  1,910,514
COFFEE MAKING APPARATUS
Filed May 27, 1930   2 Sheets-Sheet 1
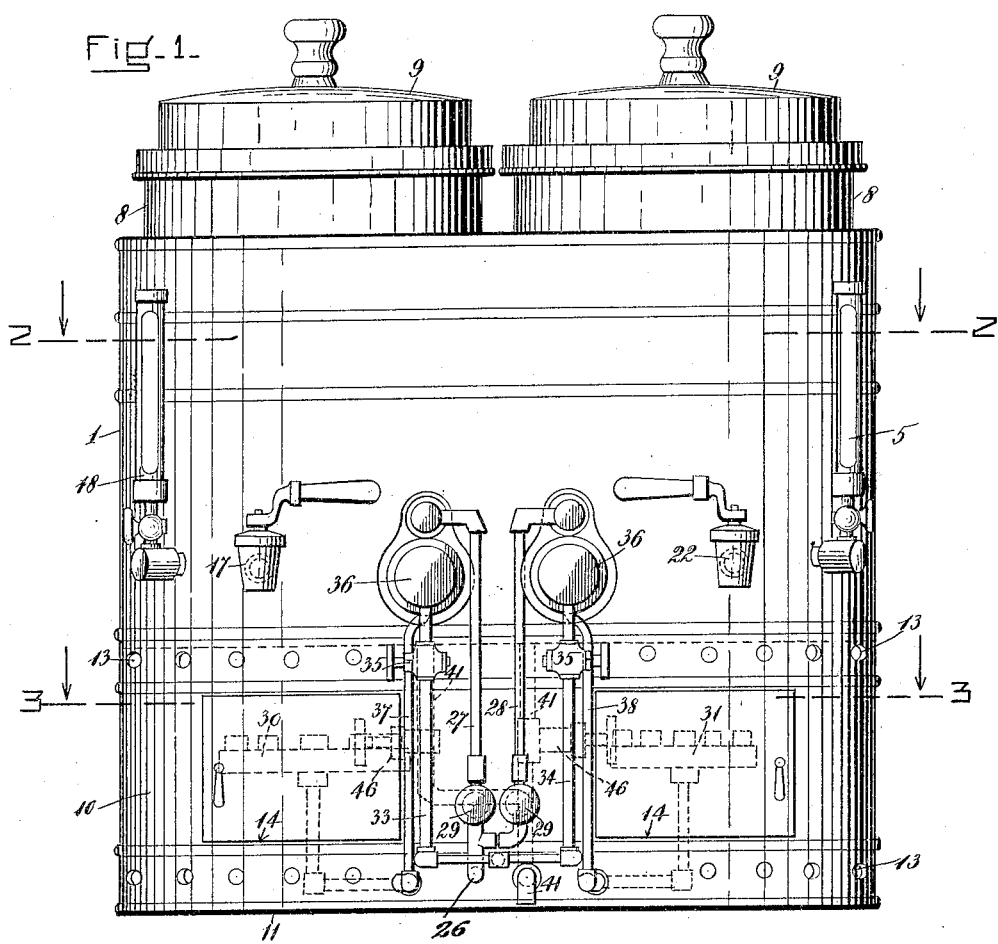
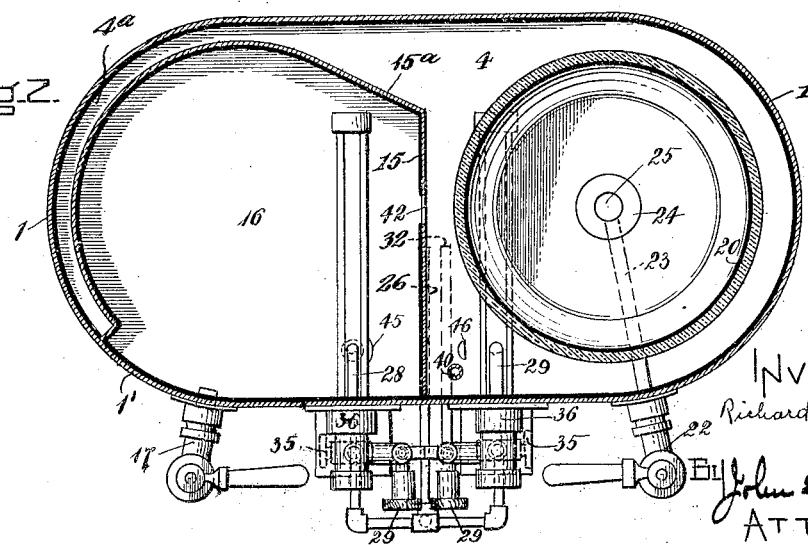
INVENTOR:
Richard C. Ashenden
By John E. R. Hayes
ATTORNEY May 23, 1933.    R. C. ASHENDEN    1,910,514
COFFEE MAKING APPARATUS
Filed May 27, 1930    2 Sheets-Sheet 2
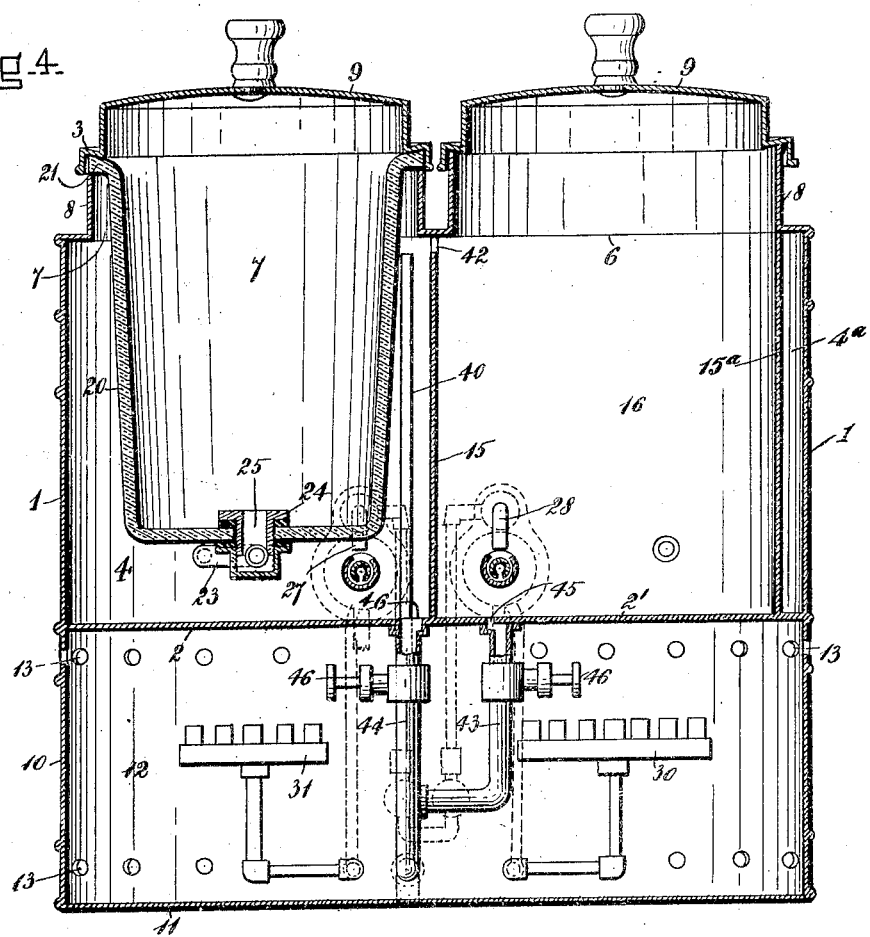
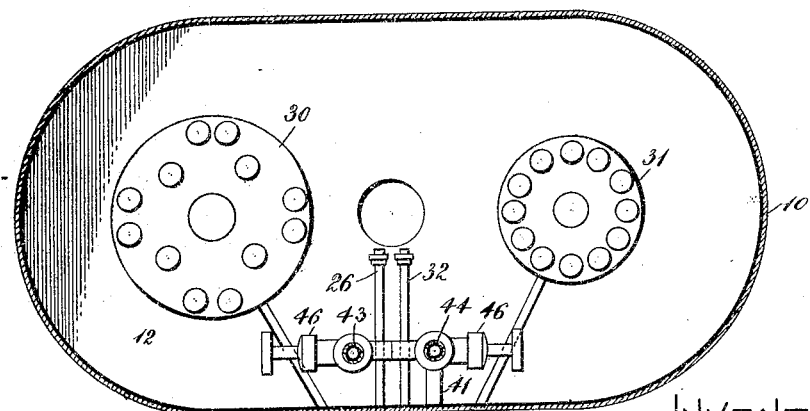
INVENTOR:
Richard C. Ashenden
By John E. R. Hayes
ATTORNEYS Patented May 23, 1933

1,910,514

UNITED STATES PATENT OFFICE

RICHARD C. ASHENDEN, OF NEWTON, MASSACHUSETTS, ASSIGNOR TO L. L. ROWE COMPANY, OF BOSTON, MASSACHUSETTS, A CORPORATION OF MASSACHUSETTS

COFFEE MAKING APPARATUS

Application filed May 27, 1930. Serial No. 456,169.

The invention relates to an improvement in coffee-making apparatus essentially of that type in which the coffee is made at the place where it is dispensed as upon a table or counter. In such type of apparatus the customary method is to provide a tank containing hot water, and to associate with the hot water tank a coffee tank or urn in which the coffee is made. The coffee is made by drawing hot water from the tank and then passing it through a bag containing coffee arranged at the entrance to the urn and through which the hot water is poured to pass into the urn. The coffee thus made is then dispensed from the urn by drawing it therefrom. During the time the coffee is being dispensed from the urn fresh water is placed in the hot water tank to replace that drawn out and is there heated to prepare it for making the next run of coffee. A difficulty arises in connection with this method. It is found that oftentimes the coffee will become exhausted from the urn before the water in the tank has become sufficiently heated to make fresh coffee. On this account a serious delay takes place to say nothing of inconvenience during the time the apparatus is out of commission.

The essential object of the invention is to obviate the difficulty just referred to and with as little heating expense as possible. In accordance also with other objects of the invention the improved apparatus embraces various constructive details for making it efficient for its objective purpose, and for safeguarding it from trouble that might arise from careless use.

The invention can best be seen and understood by reference to the drawings in which—

Figure 1 shows the apparatus in front elevation.

Fig. 2 is a section on the line 2—2 of Fig. 1.

Fig. 3 is a section on the line 3—3 of Fig. 1, and

Fig. 4 is a vertical section of the apparatus as shown in Fig. 1 but reversed in position so that the section may be viewed from the back.

Referring to the drawings:—

The exterior or body of the apparatus comprises a tank-forming jacket having a side wall 1, preferably elliptical in cross section as shown in Fig. 2, a bottom wall 2 and a top wall 3. Reference is made to the fact that the jacket is a tank-forming jacket for the reason that it is adapted to hold water within the chamber 4 enclosed by it. The tank is also fitted with a gauge 5 to indicate the height of water in the chamber 4. The top wall 3 of the tank has relatively large spaced openings 6 and 7 in it. Each of these openings is framed by a collar 8 upstanding from the top wall 3, and upon these collars fit covers 9 by which the respective openings are closed. The side wall 1 of the tank is extended below its bottom wall 2 to provide a depending skirt portion 10 with bottom 11 forming a base on which the apparatus rests, and within it a burner chamber 12 for containing the burners together with various other parts which assist in the control of the apparatus, all as will later be explained. On account of the burners within the chamber 12 the depending base portion 10 has lines of vent openings 13 within it, while access is had to the chamber 12 by way of removable doors or shutters 14 in the front of the base portion 10.

Located within the chamber 4 of the tank is a partition 15 which has edge engagement with the top, side and bottom walls of the jacket and co-operates therewith to form a hot water reserve tank or compartment 16 inside the jacket. This compartment has a bottom 2′ common with the bottom 2 of the chamber 4. The arrangement of the partition 15 inside the tank is such that the compartment 16 formed in part by it will be substantially encompassed by water contained in the chamber 4 of the jacket 1. To this end the partition 15 preferably has the general form in cross section as that shown in Fig. 2, that is, having one end portion 15a at least, coextensive for a distance with and spaced from the sidewall of the reserve hot-water compartment 16 to provide a hot-water jacket 4a communicating with the hot-water heater chamber 4. Here it will be seen that the partition, while forming a substantial part of the chamber or compartment 16 does not form the entire compartment, which is preferably formed in part by a portion 1' of the side wall of the tank jacket 1 in order that the draw-off cock 17 for hot water contained within the tank compartment 16 and also the water gauge 18 with which the tank is provided may both be arranged on the exterior of the tank jacket and have immediate access to the interior of the tank through the tank jacket. The hot water compartment 16 is arranged directly below the opening 6 in the top wall of the tank jacket so that access may be had to the tank through this opening when the cover is removed.

Located within the chamber or compartment 4 of the tank jacket beneath the opening 7 in the top wall of the tank jacket is a coffee tank or urn 20 preferably made of earthenware so that the coffee or beverage contained in the urn will be heated and kept warm by the hot water contained in the chamber 4. This urn is provided with a flange-forming top edge 21 by which the urn when contained within the chamber of the tank jacket may be disposed to rest on the top edge of the collar framing the opening 7. Thus disposed the relative size of the coffee tank or urn is such that it will extend well down into the chamber of the tank jacket so that it may be substantially encompassed by water contained within the chamber 4 of the tank jacket. The urn is provided with a draw-off cock 22 arranged on the outside of the jacket and connecting by a pipe 23 and coupling 24 with the bottom of the urn around an opening 25 in it so that coffee may flow out of the urn at the bottom and be dispensed by operation of the cock 22.

Water from any suitable source is supplied to the reserve hot water compartment or chamber 16 and also to the chamber 4 of the tank jacket. The water comes in by way of a pipe 26 arranged within the chamber 12 in the base of the apparatus (see Figs. 1 and 3). From this chamber the entering pipe passes through the wall 10 at the front of the chamber 12 to a point outside the chamber and thence turns upward to pass by way of a pipe connection 27 and branch pipe connection 28 through the front side wall of the tank jacket and into the chambers 16 and 4 respectively. The pipe connection 27 and its branch connection 28 each has a valve 29 in it by which the passages through these pipes may be controlled.

Gas burners are provided for heating the water in the coffee heater chamber 4 and the reserve hot water compartment 16. 30, 31 represent these burners of which the burner 30 is arranged beneath the bottom 2' of the compartment 16, while the burner 31 is arranged beneath the bottom 2 of the chamber 4. Gas is directed to the respective burners by way of an entering pipe 32 arranged within the chamber 12 of the base portion of the apparatus, thence passes by way of manifold or pipe connections 33, 34, each having in it a control valve 35, to thermostatic devices 36, 36, and thence by pipe connections 37, 38, respectively, to the respective burners. The thermostatic devices 36, 36 extend, one into the chamber 4 and the other into compartment 16 so that they may be actuated by the temperature of the water therein.

The chamber 4 of the tank jacket is provided with an overflow pipe 40 which extends downward into the base portion of the apparatus and there connects with the drain pipe 41. The overflow pipe is of sufficient height so that the entrance into the pipe will lie near the top of the chamber 4 in order that this chamber may be kept well filled with water. The hot water reserve compartment 16 is also provided with an overflow at the top taking the form of a port 42 through the partition 15. This port is located above the entrance to the overflow pipe 40 from the chamber 4 so that no water from this chamber can escape into the reserve hot water compartment 16, but any excess of water in the compartment 16 will flow out therefrom through the port 42 into the chamber 4. Provision is also made whereby all water may be drawn off from both the chamber 4 and the compartment 16. To this end draw-off pipe connections 43 and 44 are provided. Of these the pipe 43 leads from an opening 45 in the bottom of the compartment 16 and the pipe 44 from an opening 46 in the bottom of the chamber 4. Both pipes 43 and 44 connect with the drain pipe 41 and each has in it also a valve 46 by which the passage through it may be controlled.

In ordinary practice the water in the chamber 4 of the tank jacket is maintained at a temperature of approximately 200° F. which approximates the temperature of the coffee kept hot thereby in the urn. For making the coffee the water in the hot water reserve compartment 16 is heated to a temperature of approximately 200° F. and the quick heating of this water is obtained not only by the burner 30 arranged beneath it but also by the hot water in the heater chamber 4. It often happens that all the coffee in the urn is dispensed therefrom within a period of ten minutes. Fresh water at ordinary temperature having been directed into the reserve hot water compartment 16 for filling the same preparatory to making the next run of coffee, the heating of this water to a temperature of 200° F., if dependence were placed upon the burner alone, would take about eighteen minutes. With the hot water compartment 16 encompassed by the hot water jacket 4a, however, the heat therefrom together with the heat of the burner 30 will enable fresh water in the hot water tank to be heated to 200° F. within a period of ten minutes. Accordingly there is no intermission after all the coffee has been dispensed from the urn inasmuch as the water in the hot water compartment 16 has already become heated to a sufficiently high temperature for making a fresh run of coffee, to say nothing of the saving of expense in the use of gas.

While one form of the invention has been shown, it is to be understood that the invention is not limited to such form, but only by the terms of the appended claims.

Having thus fully described my invention, I claim and desire to secure by Letters Patent of the United States:—

1. A beverage-making apparatus including a tank having a top, bottom and connecting sidewalls, the top wall having openings therein, a partition in said tank dividing the same to provide a reserve hot-water compartment under one of the openings in said top wall and a hot-water heater compartment under the other opening, said partition having at least one end portion thereof coextensive with and spaced from the sidewall of said reserve hot-water compartment for a distance to provide a jacket communicating with a hot-water heater compartment, means whereby heat may be applied to the bottom of said tank for severally heating the water in said compartments, draft means for said beverage container, and draft means for said reservoir compartment.

2. In a beverage-making device, a beverage container, a hot-water heater tank surrounding the beverage container, a hot-water reserve tank at one side of said hot-water heater tank, a jacket extending around at least a portion of the sidewalls of said hot-water reserve tank and communicating with the hot-water heater tank, and draft means for the beverage tank and for the hot-water reserve tank respectively.

3. In a beverage-making device, a beverage container, a hot-water heater tank surrounding the beverage container, a hot-water reserve tank at one side of said hot-water heater tank, a jacket extending around at least a portion of the sidewalls of said hot-water reserve tank and communicating with the hot-water heater tank, draft means for the beverage tank and for the hot-water reserve tank respectively, overflow means providing an outlet contained within the heating tank, and other overflow means communicating said tanks and arranged above the inlet of said first overflow means, whereby the water in the reserve tank may overflow into said heater tank.

4. In a beverage-making apparatus as set forth in claim 1, further characterized by said partition having overflow means in the upper portion thereof communicating said compartments, and other overflow means providing an outlet for the apparatus and disposed in said heating compartment and having its inlet disposed below the overflow means in said partition.

RICHARD C. ASHENDEN.